Feb. 27, 1951      J. E. HENING ET AL      2,543,167
AUTOMOBILE SEAT CONVERTIBLE TO BED
Filed July 8, 1947      2 Sheets-Sheet 1
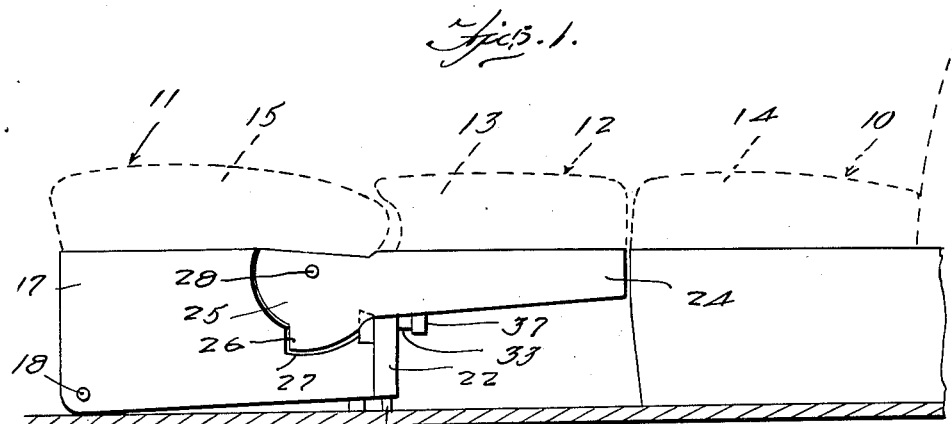
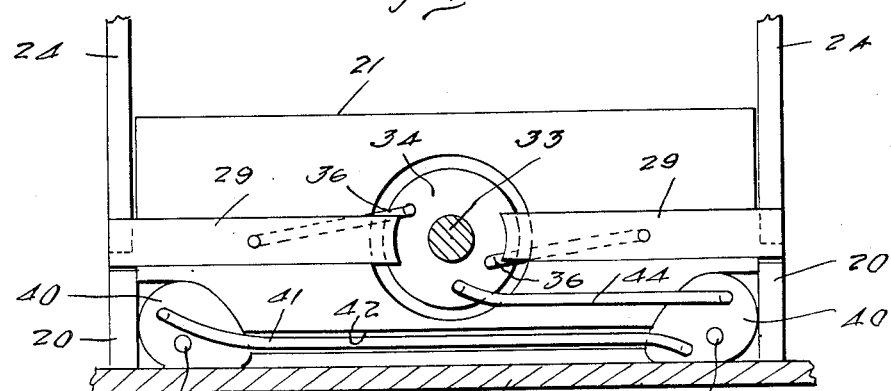
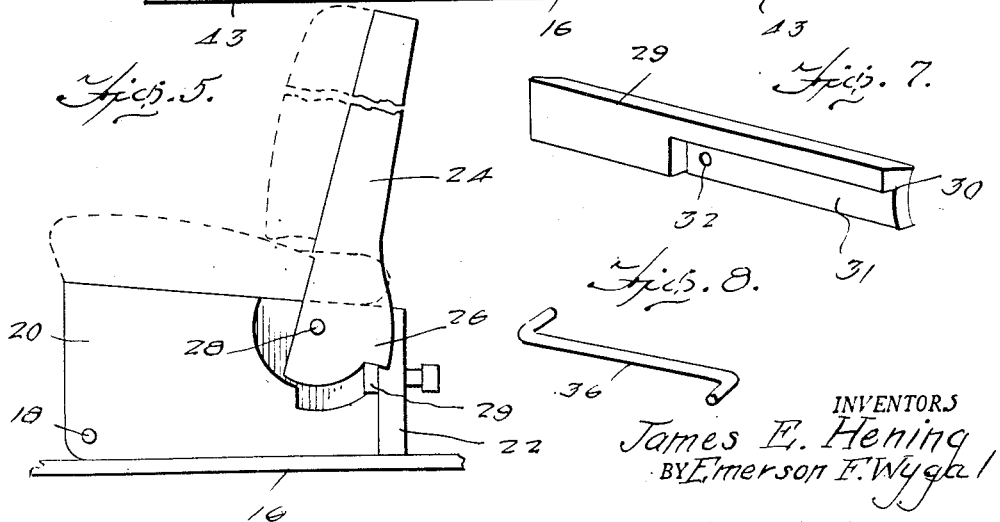
INVENTORS
James E. Hening
BY Emerson F. Wygal
McMorrow, Berman + Davidson
ATTORNEYS

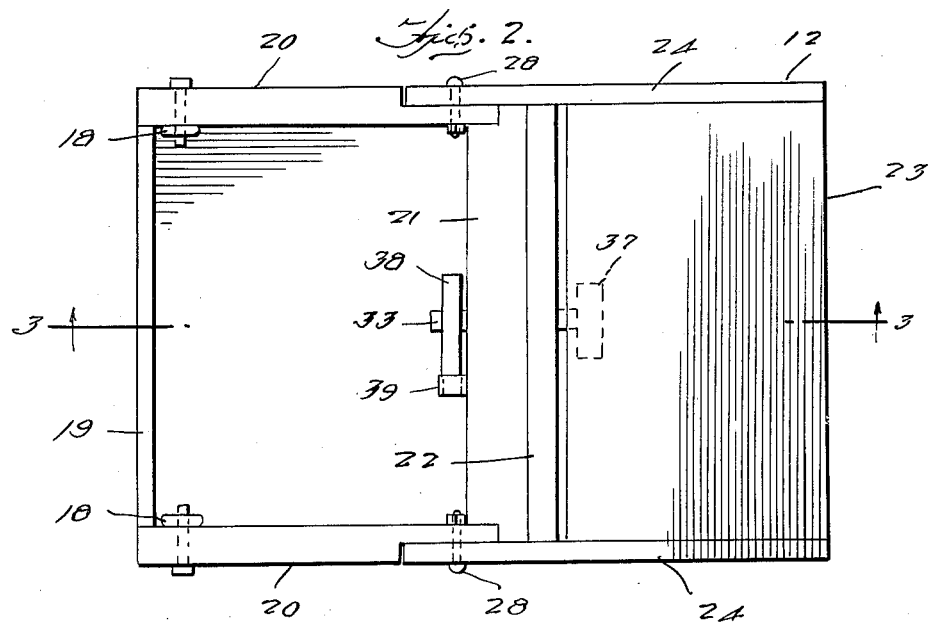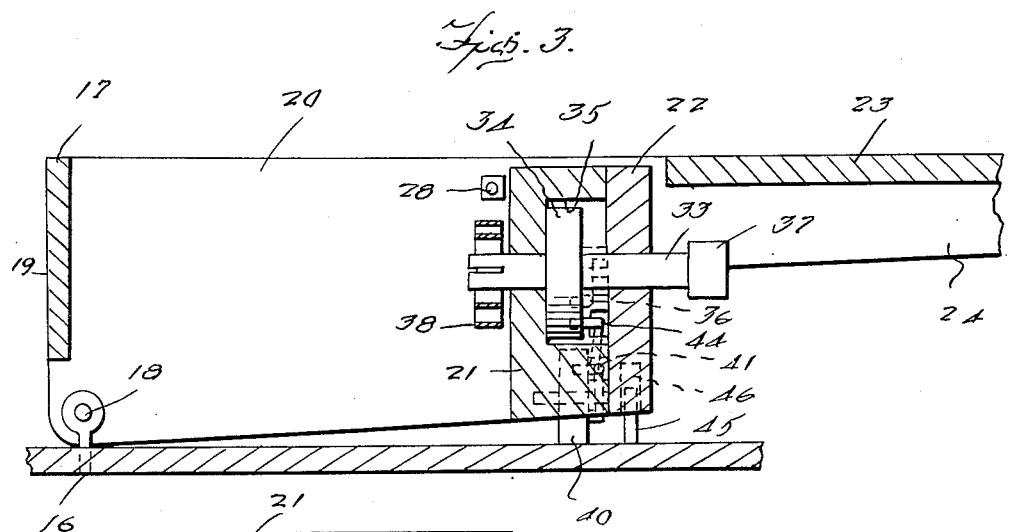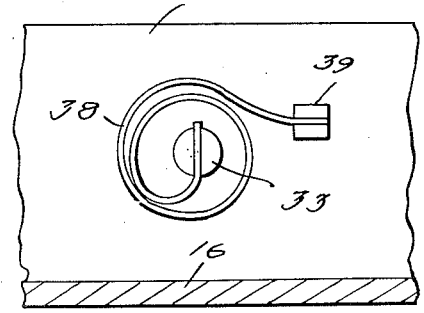

Patented Feb. 27, 1951

2,543,167

UNITED STATES PATENT OFFICE 2,543,167

AUTOMOBILE SEAT CONVERTIBLE TO BED

James E. Hening, Richmond, and Emerson F. Wygal, Nicholasville, Ky.

Application July 8, 1947, Serial No. 759,554

3 Claims. (Cl. 155—7)

This invention relates to improvement in automobiles, and more particularly to an improved automobile seat construction wherein a front seat of an automobile is provided with a pivotally-mounted back which can be folded downwardly to span the space between the front and back seat cushions to provide a comfortable, full-length bed within an automobile.

It is among the objects of the invention to provide an automobile seat having a pivotally-mounted back and improved mechanism for releasably maintaining the back in a normal upright position or in a downwardly folded position in which it cooperates with the cushions of the automobile front and rear seats to provide a comfortable full-length bed in an automobile, which mechanism is operative to level the front seat cushion and maintain it in leveled condition while the seat back is lowered, which is of adequate strength to firmly support the seat back either in its raised normal position or its lowered bed-forming position, which is operative to automatically lock the seat back in normal position when raised, and which is simple and economical in construction and easy to install in a conventional automobile.

Other objects and advantages will become apparent from a consideration of the following description in conjunction with the accompanying drawings, wherein:

Figure 1 is an end elevation of automobile front and rear seats with the front seat-back lowered to bed-forming position, the underlying seat support being shown in section;

Figure 2 is a top-plan view of the front-seat frame structure with the cushion and back upholstery removed;

Figure 3 is a transverse section on the line 3—3 of Figure 2;

Figure 4 is a rear elevation of the front-seat base with the rear cover removed showing latch mechanism and cushion-leveling mechanism carried by the base, the underlying seat support being shown in section;

Figure 5 is an end-elevational view of a front seat with the back in raised normal position;

Figure 6 is a detail elevation showing a latch-projecting spring carried by the base;

Figure 7 is a perspective view of one of the latch bars shown in Figure 4; and

Figure 8 is a perspective view of a connecting link which operatively connects the latch bar as shown in Figure 7, with the latch-retracting and projecting device shown in Figure 4.

With continued reference to the drawings, there is shown in Figure 1 an automobile rear seat, generally indicated at 10, and a front seat, generally indicated at 11, having a pivoted back at 12 movable to the lowered position illustrated in which it spans the space between the rear seat 10 and the front seat 11 with the surface of its upholstery 13 at the same level as the surface of the rear-seat cushion 14 and the front-seat cushion 15, the front-seat cushion being leveled by means presently to be described to bring its rearward portion substantially up to the level of the rear-seat cushion.

Both seats 10 and 11 are mounted on an underlying support structure 16 which may be the floor of the automobile body, and the front-seat base 17 is pivotally secured to the floor 16 at its lower-forward edge by suitable pivotal connections 18.

The base 17 may conveniently comprise a generally-rectangular hollow body having a front wall 19, sidewalls 20, a rear wall 21, preferably thicker than the front and sidewalls, and a detachable rear cover 22 overlying the rear face of the rear wall 21. The top and bottom of the rear face may be left open, the upper end or top being arranged to receive and support the front-seat cushion 15.

The back 12 of the front seat comprises a transverse frame member 23 to which the upholstery 13 is applied, and a pair of end members 24 secured to the opposite ends of the transverse member 23 and projecting downwardly at their lower ends to overlie portions of the base sidewalls 20. The lower end of each end member 24 is formed to provide a partly-circular portion 25 having at one side a radial extension 26 the end of which provides an abutment cooperating with a corresponding abutment provided in the associated base side wall to support the seat back in the lowered position illustrated in Figure 1. Each side wall 20 is preferably recessed to receive the enlarged partly-circular end portion of the corresponding end member 24 and this recess is provided with an extension 27 the end of which provides an abutment surface cooperating with the end of the extension 26 of the corresponding end member to support the seat back in its lowered position. A pivot pin or bolt 28 extends through the center of the partly-circular portion of each end member 24 and through the corresponding base side wall to pivotally secure the seat back to the base.

The back is releasably held in its raised normal position by a pair of latch bars 29 slidably mounted in corresponding grooves provided in the rear wall 21 of the base and extending from the respective ends of the rear wall 21 toward the center thereof.

Each latch bar, as illustrated in Figure 7, may comprise an elongated member of substantially rectangular cross-section having a concave inner end 30 and having a recess 31 in one side thereof extending from the inner end part way of the length of the member, said latch bar being provided with an aperture 32 near the inner end of the recess 31 therein.

A shaft 33 is pivotally mounted in the rear wall 21 at substantially the mid-length position thereof, and between the inner ends of the latch bars 29. A disc 34 is fixed on the shaft 33 and rotatably received in a circular aperture 35 provided in the rear wall 21 of the base. Z-shaped links 36 connect the latch bars 29 with the disc 34 eccentrically of the shaft 33, each link having one upset end portion received in the aperture 32 in the corresponding latch bar and its oppositely upset end portion received in a corresponding aperture in the disc 34. With this construction, when the shaft 33 is rotated, the latch bars 29 will be slidably moved in the corresponding grooves in the rear wall 21 between their retracted and projected positions. When projected, the outer ends of the latch bars 29 engage under the ends of the abutment portion 26 of the respective back-end members 24 to hold the back in its raised normal position illustrated in Figure 5.

The latch bars 29, the disc 34 and the links 36 are overlaid and held in operative position in the corresponding grooves and recesses in the rear wall 21 by the rear-wall cover 22 which is detachably secured to the rear wall overlying the rear surface thereof. The shaft 33 extends through the rear wall 21 and through the cover 22 and is provided on its end to the rear of the cover 22 with a handle 37 by means of which the shaft may be manually rotated. A spiral or clock-type spring 38 is secured at one end to the end of the shaft 33 projecting forwardly of the rear wall 21 and is secured at its other end to the rear wall 21 by a suitable fixture 39 to resiliently rotate the shaft 33 in a direction to project the latch bars 29 to the position in which they operatively engage the end members 24 of the seat back.

With this construction the shaft 33 must be rotated by the handle 37 against the force of spring 38 in order to retract the latch bars 29 so that the seat back can be lowered. When the seat back is lowered the latch bars are positively held in retracted position by the lower end portions of the end members 24 overlying the outer ends of the latch bars. The seat may be bodily lifted to its raised position and when it reaches its normal raised position the spring 38 will rotate the shaft 33 to project the latch bars 29 under the end member abutment portion 26 to positively hold the seat in its normal position.

A pair of cam members 40 are pivotally mounted in respective recesses provided in the lower corners of the rear wall 21 and are operatively connected together for simultaneous movement by a link 41 which extends through a slot 42 extending transversely of the rear wall between the cam-receiving recesses and is connected to the cams 40 at opposite sides of the respective pivotal connections 43. With this construction, when one of the cams 40 is rotated the other cam will be simultaneously and co-extensively rotated in the opposite direction. The cams 40 bear at their lower sides upon the upper surface of the underlying support or floor 16, and are effective when rotated from the retracted position shown in Figure 4 to the projected position shown in Figure 3 to raise the rear-end portion of the base 17 an amount sufficient to level the front-seat cushion 15. One of the cams 40 is operatively connected by a link 44 with the disc 34, one end of the link being connected eccentrically of the cam pivot 43, and the other end being connected eccentrically of the shaft 33 so that when the shaft 33 is rotated a pull will be exerted on the link 44 to correspondingly rotate the associated cam 40.

A pair of dowel members 45 are fixed to the underlying structure or floor 16 at the opposite ends of the base wall cover 22, and extend upwardly into corresponding wells or recesses 46 provided in the lower portion of the cover to guide the rear end of the base in its upward and downward movements and prevent lateral movement of the rear end of the base relative to the floor of the vehicle body.

With this construction, when the shaft 33 is rotated to release the seat back 12, the rear end of the seat base 17 will be simultaneously raised to level the seat cushion and bring the lower end of the seat back substantially up to a level with the top of the rear-seat cushion 14.

There is thus provided a simple and easily operable means for conveniently converting a front and rear seat of an automobile into a comfortable full-length bed.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An automobile seat comprising a hollow base, a cushion supported on said base, a back for said seat including end members extending at their lower ends to overlap said base and having stops thereon engageable with corresponding stops on said base to positively maintain said back in a predetermined lowered position, and a transverse frame member extending between said end members and secured thereto, a pair of slidable, oppositely movable latch bars supported by said base at the rear thereof and engaging the end members of said back when projected to releasably latch said back in raised position, a shaft rotatably supported in said base substantially at right angles to said latch bars, links connecting said bars to said shaft eccentrically thereof to retract and project said latch bars when said shaft is turned, a handle on said shaft for manually turning it, a spring operatively connected between said shaft and said base to turn said shaft in a latch-bar projecting direction, a pair of cams pivotally secured to said base and operative when turned to level said seat cushion by raising the rear side of said base, a link inter-connecting said cams for simultaneous movement thereof, a link operatively connecting one of said cams to said shaft eccentrically thereof, to turn said cams when said shaft is turned, and guide dowels operatively associated with said base.

2. An automobile seat comprising a hollow base pivotally secured at its front lower edge to an underlying support, a seat back having end members extending downwardly and pivotally secured to said base, stop means provided on said base and end members supporting said back when in lowered position, latch means carried by said base operative when projected to engage said end members and hold said back in raised position, a shaft supported by said base and having a handle thereon for manually turning the same, means operatively connecting said shaft with said latch means to retract and project said latch means upon turning of said shaft in opposite directions, spring means operatively connected between said shaft and said base to turn said shaft in the latch projecting direction to automatically latch said back in raised position, and means carried by said base and operatively connected with said shaft to raise the rear-side of said base to cushion-leveling position when said shaft is turned to retract said latch means.

3. An automobile seat having a base, a cushion supported on said base, a back pivotally connected at its lower end to said base for movement between a lowered, bed-forming position and a raised normal position, abutment means on said back and said base supporting said back in said lowered position, releasable latch means supporting said back in said raised position, cushion-leveling means carried by said base, manually-operable means carried by said base, and means operatively connecting said manually-operable means with said latch means and said cushion-leveling means to simultaneously retract said latch means and level said cushion upon operation of said manually-operable means.

JAMES E. HENING.

EMERSON $\underset{\text{mark}}{\overset{\text{his}}{\times}}$ F. WYGAL.

Witness to mark:
WALLACE H. WYGAL.

REFERENCES CITED

The following references are of record in the file of this patent:

UNITED STATES PATENTS

| Number | Name | Date |
|---|---|---|
| 1,224,982 | Waseim | May 8, 1917 |
| 1,369,150 | Welch | Feb. 22, 1921 |
| 1,702,284 | Thien et al. | Feb. 19, 1929 |
| 1,829,030 | Arnold | Oct. 27, 1931 |
| 1,928,177 | Hirshfield | Sept. 26, 1933 |
| 1,981,212 | Zeller | Nov. 20, 1934 |
| 2,093,224 | Zechman | Sept. 14, 1937 |